United States Patent
Takahashi

(10) Patent No.: US 8,133,620 B2
(45) Date of Patent: Mar. 13, 2012

(54) POLYMER ELECTROLYTE SECONDARY CELL

(75) Inventor: Kentaro Takahashi, Moriguchi (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 557 days.

(21) Appl. No.: 12/342,682

(22) Filed: Dec. 23, 2008

(65) Prior Publication Data
US 2009/0169976 A1    Jul. 2, 2009

(30) Foreign Application Priority Data
Dec. 28, 2007   (JP) ................. 2007-340513

(51) Int. Cl.
*H01M 6/18*   (2006.01)

(52) U.S. Cl. ........ 429/317; 429/303; 429/300; 429/306; 429/304; 429/200; 429/479; 429/309

(58) Field of Classification Search ............. 429/317, 429/303, 300, 306, 304, 200, 479, 309
See application file for complete search history.

(56) References Cited

U.S. PATENT DOCUMENTS

| | | | |
|---|---|---|---|
| 6,316,145 B1 * | 11/2001 | Kida et al. ............ | 429/306 |
| 6,322,924 B1 * | 11/2001 | Hirahara et al. ........ | 429/309 |
| 2002/0028388 A1 | 3/2002 | Lee | |
| 2003/0059681 A1 | 3/2003 | Noh | |
| 2003/0068562 A1 | 4/2003 | Kim et al. | |
| 2003/0152837 A1 | 8/2003 | Noh | |
| 2004/0058251 A1 | 3/2004 | Hamamoto et al. | |
| 2008/0076031 A1 * | 3/2008 | Yamaguchi et al. ...... | 429/200 |

FOREIGN PATENT DOCUMENTS

| | | | |
|---|---|---|---|
| JP | 2002-151150 A | | 5/2002 |
| JP | 2002-324577 A | | 11/2002 |
| JP | 2003-151633 A | | 5/2003 |
| JP | 2003-197264 A | | 7/2003 |
| JP | 2003-223932 A | | 8/2003 |
| JP | 2006-32301 A | | 2/2006 |
| KR | 2008058197 | * | 6/2008 |
| WO | 02/15319 A1 | | 2/2002 |

* cited by examiner

*Primary Examiner* — Laura Weiner
(74) *Attorney, Agent, or Firm* — Westerman, Hattori, Daniels & Adrian, LLP

(57) ABSTRACT

A polymer electrolyte secondary cell with high safety against overcharging includes a positive electrode containing a positive electrode active material; a negative electrode containing a negative electrode active material; a polymer electrolyte containing a non-aqueous solvent, an electrolyte salt, and a polymer. The non-aqueous solvent contains a tertiary carboxylic acid ester shown in Formula 1 below. The polymer is formed from monomers containing alkylene glycol (meth)acrylate and/or N,N-dialkyl (meth)acrylamide.

Formula 1

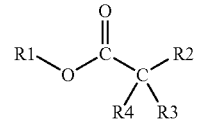

where R1 to R4 each denote a straight-chained or branched alkyl group having 4 or less carbon atoms and may be the same or different.

7 Claims, No Drawings

POLYMER ELECTROLYTE SECONDARY CELL

BACKGROUND OF THE INVENTION

1. Field of the Invention

The present invention relates to a technique to improve the safety of polymer electrolyte secondary cells at the time of overcharge.

2. Background Art

Non-aqueous electrolyte secondary cells, for their high energy density and high capacity, are widely used for the driving power sources of mobile appliances. In particular, cells having thin film such as an aluminum laminated film as an outer casing and a polymer electrolyte as a non-aqueous electrolyte are widely used in the above applications. The reason for their wide use is that these cells are small and lightweight and have no risk of electrolyte leakage.

Popular polymer electrolytes consist of a polymer matrix and a non-aqueous electrolytic solution contained therein. The polymer matrix is made by polymerizing a monomer. The non-aqueous electrolytic solution contains an organic solvent and an electrolyte salt dissolved therein. The organic solvent is flammable, so that smoking or firing may result when the cells should be overcharged. This has created a need for a technique to improve the safety of polymer electrolyte secondary cells at the time of overcharge.

Patent documents 1 to 5 disclose techniques related to polymer electrolyte secondary cells.

Patent Document 1: Japanese Patent Unexamined Publication No.2002-151150

Patent Document 2: Japanese Patent Unexamined Publication No.2002-324577

Patent Document 3: Japanese Patent Unexamined Publication No.2003-151633

Patent Document 4: Japanese Patent Unexamined Publication No.2003-197264

Patent Document 5: Japanese Patent Unexamined Publication No.2003-223932

All these techniques, however, are still not sufficient to ensure safety against overcharging of the cells.

SUMMARY OF THE INVENTION

In view of the foregoing problem, it is an object of the present invention to provide a polymer electrolyte secondary cell having high safety against overcharging to prevent the emission of smoke or ignition.

In order to accomplish the above and other objects, the present invention is configured as follows.

The polymer electrolyte secondary cell includes: a positive electrode containing a positive electrode active material; a negative electrode containing a negative electrode active material; and a polymer electrolyte containing a non-aqueous solvent, an electrolyte salt and a polymer. The non-aqueous solvent contains a tertiary carboxylic acid ester represented by Formula 1. The polymer is polymerized from monomers containing alkylene glycol (meth)acrylate and/or N,N-dialkyl (meth)acrylamide.

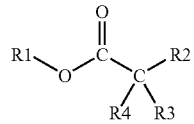

Formula 1 where R1 to R4 each denote a straight-chained or branched alkyl group having 4 or less carbon atoms and may be the same or different.

With this structure, the tertiary carboxylic acid ester shown in Formula 1 acts in cooperation with the polymer obtained by polymerizing the monomers containing alkylene glycol (meth)acrylate and/or N,N-dialkyl (meth)acrylamide so as to prevent the emission of smoke or ignition when the cell is overcharged at a high rate. This dramatically improves safety against overcharging.

The tertiary carboxylic acid ester may be methyl trimethylacetate and/or ethyl trimethylacetate.

Using methyl trimethylacetate (compound with methyl groups for all R1 to R4 in Formula 1) and/or ethyl trimethylacetate (compound with an ethyl group for R1 and methyl groups for R2 to R4 in Formula 1) is preferable because of their high effect per unit mass.

The alkylene glycol (meth)acrylate may be polypropylene glycol diacrylate.

Polypropylene glycol diacrylate is preferable because of its higher effect than other alkylene glycol (meth)acrylates.

The content of the polypropylene glycol diacrylate may be 2.0 to 8.0 mass parts out of 100 mass parts of the total mass of the non-aqueous solvent and the electrolyte salt.

The aforementioned range is preferable because of the following reason. When the content of polypropylene glycol diacrylate is less than 2.0 mass parts, its effect may be insufficient, whereas when the content exceeds 8.0 mass parts, too much amount of the polymer may impede the smooth progress of the charge-discharge reactions.

The N,N-dialkyl (meth)acrylamide may be N,N-dimethylacrylamide.

N,N-dimethylacrylamide is preferable because of its higher effect than other N,N-dialkyl (meth)acrylamides.

The content of the N,N-dimethylacrylamide may be 1.7 to 4.0 mass parts out of 100 mass parts of the total mass of the non-aqueous solvent and the electrolyte salt.

The aforementioned range is preferable because of the following reason. When the content of N,N-dimethylacrylamide is less than 1.7 mass parts, its effect may be insufficient, whereas when the content exceeds 4.0 mass parts, too much amount of the polymer may impede the smooth progress of the charge-discharge reactions.

The content of the tertiary carboxylic acid ester in the total volume of the non-aqueous solvent may be 10 to 90 volume % at 25° C. and 1 atm.

The aforementioned range is preferable because of the following reason. When the content of tertiary carboxylic acid ester is less than 10 volume %, its the effect may be insufficient, whereas when the content exceeds 90 volume %, the tertiary carboxylic acid ester may be decomposed by reaction with the electrodes, thereby reducing safety against overcharging.

DETAILED DESCRIPTION OF THE INVENTION

Preferred embodiments of the present invention will be described below. It will be appreciated that the present invention will not be limited to the examples below, and that any practice of the invention with suitable amendments is possible without departing from the scope of the invention.

(Embodiments)

<Preparation of the Positive Electrode>

Ninety-five mass parts of lithium cobalt composite oxide serving as a positive electrode active material, 2 mass parts of acetylene serving as a conducting agent, 3 mass parts of polyvinylidene fluoride (PVdF) serving as a binding agent, and N-methyl-2-pyrrolidone (NMP) are mixed together, thus preparing a positive electrode active material slurry. This positive electrode active material slurry is applied to both surfaces of a positive electrode current collector (12 μm thick) made of aluminum by doctor blading, followed by drying to remove the solvent (NMP), which is necessary for preparation of the slurry. Then, the dried electrode plate is rolled to a thickness of 120 μm and cut to a predetermined size, thus completing a positive electrode.

<Preparation of the Negative Electrode>

Ninety-five mass parts of a negative electrode active material made of artificial graphite (d(002) value: 0.336 nm) with its surface non-crystallized, 5 mass parts of polyvinylidene fluoride (PVdF) serving as a binding agent, and N-methyl-pyrrolidone are mixed together, thus preparing a negative electrode active material slurry. This negative electrode active material slurry is applied to both surfaces of a negative electrode current collector (8 μm thick) made of copper, followed by drying to remove the solvent (NMP), which is necessary for preparation of the slurry. Then, the dried electrode plate is rolled to a thickness of 130 μm and cut to a predetermined size, thus completing a negative electrode.

<Preparation of the Electrode Assembly>

The positive and negative electrodes were wound with a separator (16 μm thick) made of finely porous film of polyolefin, and then pressed, thus preparing a flatly wound electrode assembly.

<Preparation of Pre-Gel Electrolyte "a">

Methyl trimethylacetate (MTMA) represented by Formula 2 and ethylene carbonate (EC) are mixed in a volume ratio of 90:10 at 25° C. and 1 atm to form a non-aqueous solvent. Next, $LiPF_6$ serving as an electrolyte salt is dissolved at a rate of 1.0 M (mol/liter) in this mixture so as to prepare a non-aqueous electrolytic solution. Then, 5.0 mass parts of a (meth)acrylate monomer as a monomer is mixed with 100 mass parts of this non-aqueous electrolytic solution, and 5000 ppm of tert-butyl peroxypivalate as a polymerization initiator was added thereto. This results in the completion of a pre-gel electrolyte "a".

Formula 2

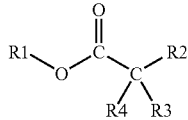

where R1 to R4 are all methyl groups.

<Preparation of Pre-Gel Electrolyte "b">

Methyl trimethylacetate (MTMA) represented by Formula 2, ethylene carbonate (EC), and propylene carbonate (PC) are mixed in a volume ratio of 50:30:20 at 25° C. and 1 atm to form a non-aqueous solvent. $LiPF_6$ serving as an electrolyte salt is dissolved at 1.0 M (mol/liter) in this mixture so as to prepare a non-aqueous electrolytic solution. Then, 2.5 mass parts of polyvinyl formal (PVF) as a monomer is mixed with 100 mass parts of this non-aqueous electrolytic solution, and 3000 ppm of isophthalaldehyde as a polymerization initiator is added thereto. This results in the completion of a pre-gel electrolyte "b".

<Assembly of the Cell>

A commercial aluminum laminate is prepared. This aluminum laminate material is folded to form a bottom portion and a cup-form electrode assembly storage space. Then, this flatly wound electrode assembly is inserted into the storage space.

The pre-gel electrolyte "a" or "b" is injected into the space. Then, the inside of the outer casing is decompressed, the separator is impregnated with the pre-gel electrolyte, and the opening of the outer casing is sealed. The outer body is kept in a constant temperature chamber at 600C for three hours, and then the monomer is polymerized to complete a polymer electrolyte secondary cell.

EXAMPLES 1 TO 39 AND COMPARATIVE EXAMPLES 1 to 24

Cells according to examples 1 to 39 and comparative examples 1 to 24 were prepared in the same manner as in the above embodiment except that the kind of the non-aqueous solvent, the volume mixture ratio of the non-aqueous solvent, the kind of the monomer, and the content of the monomer were varied as shown in Tables 1 to 3.

Initial Capacity Test

Cells were prepared in the same manner as in Examples 1 to 39 and Comparative Examples 1 to 24. These cells were charged at a constant current of 0.5 It (385 mA) to a voltage of 4.2V, and then at a constant voltage of 4.2V for 5 hours in total. Next, the cells were discharged at a constant current of 0.5 It (385 mA) to a voltage of 2.75V. The discharge capacities were measured and assumed an initial capacity. The charging and discharging were performed at 23° C. The results are shown in Tables 1 to 3.

Cycle Characteristic Test

Cells were prepared in the same manner as in Examples 1 to 39 and Comparative Examples 1 to 24. These cells were subjected to 500 cycles of charge-discharge under the following conditions.

i) The cells were charged at a constant current of 1.0 It (770 mA) to a voltage of 4.2 V and then at a constant voltage of 4.2 V for 3 hours in total.

ii) The cells were discharged at a constant current of 1.0 It (770 mA) to a voltage of 2.75 V.

iii) Return to i)

The cycle characteristic of each cell was calculated from the following formula. The charging and discharging were carried out at 23° C. The results are shown in Tables 1 to 3.

Cycle characteristic (%) 500th cycle discharge capacity/1st cycle discharge capacity×100

Overcharge Safety Test

Cells were prepared in the same manner as in Examples 1 to 39 and Comparative Examples 1 to 24 and tested as follows.

i) These cells were charged at a constant current of 0.6 It (462 mA) to a voltage of 12.0 V and then at a constant voltage of 12.0 V for 15 hours in total. The cases where smoking occurred during this overcharge were not further tested, and the current value at this time was assumed a current limit value.

ii) For the cases where no smoking occurred, respective new cells were prepared under the same conditions. The new cells were subjected to the same test as i) except that the constant current during the charge was raised to 0.1 It (77 mA)

iii) The cases where no smoking occurred were subjected to a test with a constant current value raised in the ii) manner during the charge until smoking was observed.

A maximum current rate of each cell at which no smoking was observed was estimated as a current limit value, and the results are shown in Tables 1 to 3. The test was carried out at 23° C.

TABLE 1

| | Non-aqueous solvent | | Polymer | | Initial capacity (mAh) | Cycle Characteristic (%) | current limit value (It) |
|---|---|---|---|---|---|---|---|
| | Kind | Volume Ratio | Kind | Mass % | | | |
| Example. 1 | EC/MTMA | 10/90 | PAG2 | 5.0 | 783 | 78 | 1.6 |
| Example. 2 | EC/MTMA | 20/80 | PAG2 | 5.0 | 781 | 80 | 2.3 |
| Example. 3 | EC/MTMA | 20/80 | DMAA | 2.3 | 784 | 76 | 2.3 |
| Example. 4 | EC/MTMA | 20/80 | PAG2/DMAA | 3.0/1.5 | 784 | 78 | 2.4 |
| Example. 5 | EC/MTMA | 30/70 | PAG2 | 5.0 | 783 | 81 | 2.3 |
| Example. 6 | EC/MTMA | 40/60 | PAG2 | 5.0 | 783 | 82 | 2.3 |
| Example. 7 | EC/PC/MTMA | 30/10/60 | PAG2 | 5.0 | 785 | 80 | 2.3 |
| Example. 8 | EC/PC/MTMA | 30/20/50 | PAG2 | 5.0 | 784 | 80 | 2.5 |
| Example. 9 | EC/PC/MTMA | 30/20/50 | PAG2/DMAA | 3.0/1.5 | 782 | 79 | 2.6 |
| Example. 10 | EC/PC/MTMA | 30/20/50 | PAG2/PAG6 | 4.5/0.5 | 782 | 81 | 2.4 |
| Example. 11 | EC/PC/MTMA | 30/20/50 | PAG1 | 5.0 | 786 | 76 | 2.4 |
| Example. 12 | EC/PC/MTMA | 30/20/50 | DMAA | 2.3 | 785 | 79 | 2.5 |
| Example. 13 | EC/PC/MTMA | 30/20/50 | DEAA | 2.3 | 785 | 77 | 2.5 |
| Example. 14 | EC/GBL/MTMA | 30/20/50 | PAG2 | 5.0 | 783 | 75 | 2.2 |
| Example. 15 | EC/DEC/MTMA | 30/20/50 | PAG2 | 5.0 | 781 | 80 | 1.9 |
| Example. 16 | EC/EMC/MTMA | 30/20/50 | PAG2 | 5.0 | 783 | 79 | 2.2 |
| Example. 17 | EC/DMC/MTMA | 30/20/50 | PAG2 | 5.0 | 785 | 76 | 2.4 |
| Example. 18 | EC/PC/MTMA | 40/20/40 | PAG2 | 5.0 | 785 | 82 | 2.5 |
| Example. 19 | EC/PC/MTMA | 40/30/30 | PAG2 | 5.0 | 783 | 80 | 2.5 |
| Example. 20 | EC/PC/MTMA | 50/30/20 | PAG2 | 5.0 | 784 | 76 | 2.1 |
| Example. 21 | EC/PC/MTMA | 50/40/10 | PAG2 | 5.0 | 784 | 77 | 1.7 |
| Comparative Example. 1 | EC/PC | 50/50 | PAG2 | 5.0 | 782 | 77 | 1.2 |
| Comparative Example. 2 | EC/GBL | 40/60 | PAG2 | 5.0 | 782 | 61 | 1.1 |
| Comparative Example. 3 | EC/DEC | 30/70 | PAG2 | 5.0 | 782 | 80 | 0.6 |
| Comparative Example. 4 | EC/EMC | 30/70 | PAG2 | 5.0 | 786 | 78 | 0.6 |
| Comparative Example. 5 | EC/DMC | 30/70 | PAG2 | 5.0 | 785 | 71 | 0.7 |
| Comparative Example. 6 | EC/PC/DEC | 30/20/50 | PAG2 | 5.0 | 786 | 80 | 0.6 |
| Comparative Example. 7 | EC/PC/EMC | 30/20/50 | PAG2 | 5.0 | 784 | 80 | 0.6 |
| Comparative Example. 8 | EC/PC/DMC | 30/20/50 | PAG2 | 5.0 | 783 | 76 | 0.7 |
| Comparative Example. 9 | EC/PC/MP | 30/20/50 | PAG2 | 5.0 | 786 | 64 | 0.9 |
| Comparative Example. 10 | EC/PC/MIBT | 30/20/50 | PAG2 | 5.0 | 784 | 58 | 0.8 |

TABLE 2

| | Non-aqueous solvent | | Polymer | | Initial capacity (mAh) | Cycle Characteristic (%) | current limit value (It) |
|---|---|---|---|---|---|---|---|
| | Kind | Volume ratio | Kind | Mass % | | | |
| Example. 22 | EC/PC/MTMA | 30/20/50 | PAG2/PAG6 | 2.0/0.5 | 785 | 76 | 1.8 |
| Example. 23 | EC/PC/MTMA | 30/20/50 | PAG2/PAG6 | 2.0/0.5 | 786 | 77 | 1.9 |
| Example. 24 | EC/PC/MTMA | 30/20/50 | PAG2 | 3.5 | 782 | 80 | 2.1 |
| Example. 25 | EC/PC/MTMA | 30/20/50 | PAG2 | 4.5 | 782 | 81 | 2.3 |
| Example. 8 | EC/PC/MTMA | 30/20/50 | PAG2 | 5.0 | 784 | 80 | 2.5 |
| Example. 26 | EC/PC/MTMA | 30/20/50 | PAG2 | 6.0 | 782 | 82 | 2.5 |
| Example. 27 | EC/PC/MTMA | 30/20/50 | PAG3 | 7.0 | 780 | 80 | 2.4 |
| Example. 28 | EC/PC/MTMA | 30/20/50 | PAG4 | 8.0 | 773 | 76 | 2.8 |
| Example. 29 | EC/PC/MTMA | 30/20/50 | DMAA | 1.7 | 788 | 75 | 1.9 |
| Example. 30 | EC/PC/MTMA | 30/20/50 | DMAA | 2.0 | 785 | 79 | 2.1 |
| Example. 12 | EC/PC/MTMA | 30/20/50 | DMAA | 2.3 | 785 | 79 | 2.5 |
| Example. 31 | EC/PC/MTMA | 30/20/50 | DMAA | 3.0 | 783 | 81 | 2.8 |
| Example. 32 | EC/PC/MTMA | 30/20/50 | DMAA | 3.5 | 775 | 76 | 2.7 |
| Example. 33 | EC/PC/MTMA | 30/20/50 | DEAA | 3.5 | 773 | 74 | 3.0 |
| Example. 34 | EC/PC/MTMA | 30/20/50 | DMAA | 4.0 | 772 | 74 | 2.9 |

TABLE 3

| | Non-aqueous solvent | | Polymer | | Initial capacity (mAh) | Cycle characteristic (%) | current limit value (It) |
|---|---|---|---|---|---|---|---|
| | Kind | Volume ratio | Kind | Mass % | | | |
| Example. 11 | EC/PC/MTMA | 30/20/50 | PAG1 | 5.0 | 786 | 76 | 2.4 |
| Example. 8 | EC/PC/MTMA | 30/20/50 | PAG2 | 5.0 | 784 | 80 | 2.5 |
| Example. 35 | EC/PC/MTMA | 30/20/50 | PAG3 | 5.0 | 784 | 80 | 2.3 |
| Example. 36 | EC/PC/MTMA | 30/20/50 | PAG4 | 5.0 | 783 | 78 | 2.4 |
| Example. 37 | EC/PC/MTMA | 30/20/50 | PAG5 | 5.0 | 785 | 75 | 2.2 |
| Example. 12 | EC/PC/MTMA | 30/20/50 | DMAA | 2.3 | 785 | 79 | 2.5 |
| Example. 13 | EC/PC/MTMA | 30/10/60 | DEAA | 2.3 | 785 | 77 | 2.5 |
| Example. 4 | EC/MTMA | 20/80 | PAG2/DMAA | 3.0/1.5 | 784 | 78 | 2.4 |
| Comparative Example. 11 | EC/PC/MTMA | 30/20/50 | PES1 | 4.5 | 788 | 76 | 1.1 |
| Comparative Example. 12 | EC/PC/MTMA | 30/20/50 | PES1 | 5.0 | 782 | 77 | 1.2 |
| Comparative Example. 13 | EC/PC/MTMA | 30/20/50 | PES2 | 5.0 | 783 | 76 | 1.2 |
| Comparative Example. 14 | EC/PC/MTMA | 30/20/50 | PES3 | 4.5 | 784 | 78 | 1.0 |
| Comparative Example. 15 | EC/PC/MTMA | 30/20/50 | PES1/PES3 | 2.5/2.0 | 787 | 79 | 1.1 |
| Comparative Example. 16 | EC/PC/MTMA | 30/20/50 | PVF | 2.5 | 784 | 74 | 0.9 |
| Comparative Example. 17 | EC/PC/MTMA | 30/20/50 | PVF | 3.0 | 783 | 70 | 0.8 |
| Comparative Example. 18 | EC/PC/MTMA | 30/20/50 | PVF | 4.0 | 775 | 61 | 1.0 |
| Comparative Example. 19 | EC/PC/DEC | 30/20/50 | PES2 | 5.0 | 784 | 79 | 0.7 |
| Comparative Example. 20 | EC/PC/DEC | 30/20/50 | PES3 | 4.5 | 784 | 80 | 0.7 |
| Comparative Example. 21 | EC/PC/DEC | 30/20/50 | PES1/PES3 | 2.5/2.0 | 787 | 81 | 0.7 |
| Comparative Example. 22 | EC/PC/DEC | 30/20/50 | PVF | 2.5 | 782 | 77 | 0.7 |
| Comparative Example. 23 | EC/PC | 50/50 | PES3 | 4.5 | 781 | 78 | 1.1 |
| Comparative Example. 24 | EC/PC | 50/50 | PVF | 2.5 | 782 | 75 | 1.2 |
| Example. 38 | EC/PC/MTMA | 30/20/50 | PES3/PAG2 | 2.0/2.5 | 782 | 78 | 2.3 |
| Example. 39 | EC/PC/MTMA | 30/20/50 | PVF/PAG2 | 2.5/2.0 | 785 | 75 | 2.4 |

In Tables 1 to 3, the meanings of the abbreviations in the section of "non-aqueous solvent" are as follows:
  EC: ethylene carbonate
  PC: propylene carbonate
  GBL: γ-buthyrolactone
  DEC: diethyl carbonate
  EMC: ethyl methyl carbonate
  DMC: dimethyl carbonate
  MTMA: methyl trimethylacetate
  ETMA: ethyl trimethylacetate
  MP: methyl propionate (primary carboxylic acid ester)
  MIBT: methyl isobuthyrate (secondary carboxylic acid ester)
The meanings of the abbreviations in the section of "polymer" are as follows:

PAG1: dipropylene glycol diacrylate
  PAG2: tripropylene glycol diacrylate
  PAG3: heptapropylene glycol diacrylate
  PAG4: tetraethylene glycol diacrylate
  PAG5: nonaethylene glycol diacrylate
  PAG6: propoxylated pentaerythritol tetraacrylate
  DMAA: N,N-dimethylacrylamide
  DEAA: N,N-diethylacrylamide
  PVF: polyvinyl formal
  PES1: the compound represented by Formula 3
  PES2: the compound represented by Formula 4
  PES3: the compound represented by Formula 5
  (PES1 to PES3 are all polyester-based monomers)

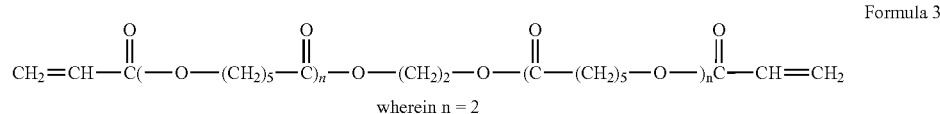

Formula 3

$$CH_2=CH-\overset{O}{\underset{\|}{C}}(-O-(CH_2)_5-\overset{O}{\underset{\|}{C}})_n-O-(CH_2)_2-O-(\overset{O}{\underset{\|}{C}}-(CH_2)_5-O-)_n\overset{O}{\underset{\|}{C}}-CH=CH_2$$

wherein n = 2

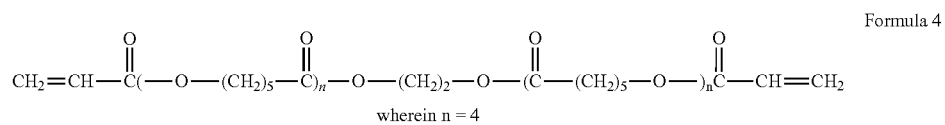

Formula 4

$$CH_2=CH-\overset{O}{\underset{\|}{C}}(-O-(CH_2)_5-\overset{O}{\underset{\|}{C}})_n-O-(CH_2)_2-O-(\overset{O}{\underset{\|}{C}}-(CH_2)_5-O-)_n\overset{O}{\underset{\|}{C}}-CH=CH_2$$

wherein n = 4

-continued

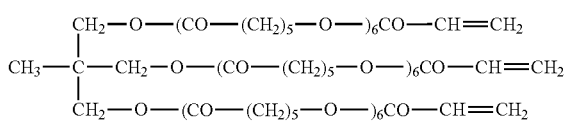

Formula 5

Tables 1 to 3 indicate that Examples 1, 2, and 5 to 8 have higher current limit value (1.6 to 2.5 It) than Comparative Examples 1 to 10 (0.6 to 1.2 It) and Comparative Examples 11 to 24 (0.7 to 1.2 It). Examples 1, 2, and 5 to 8 use a non-aqueous solvent containing methyl trimethylacetate (MTMA) and a monomer containing tripropylene glycol diacrylate (PAG2). On the other hand, Comparative Examples 1 to 10 use a non-aqueous solvent not containing methyl trimethylacetate, and Comparative Examples 11 to 24 use a monomer not containing alkylene glycol diacrylate.

Tables 1 to 3 also indicate that Examples 3, 12, and 13 have higher current limit value (2.3 to 2.5 It) than Comparative Examples 1 to 10 (0.6 to 1.2 It) and Comparative Examples 11 to 24 (0.7 to 1.2 It). Examples 3, 12, and 13 use a non-aqueous solvent containing methyl trimethylacetate (MTMA) and a monomer containing N,N-dimethylacrylamide (DMAA) or N,N-diethylacrylamide (DEAA). On the other hand, Comparative Examples 1 to 10 use a non-aqueous solvent not containing methyl trimethylacetate, and Comparative Examples 11 to 24 use a monomer not containing N,N-dialkylacrylamide.

These results are considered to be due to the following reasons. The methyl trimethylacetate (tertiary carboxylic acid ester) contained in the non-aqueous solvent acts in cooperation with alkylene glycol (meth)acrylate or N,N-dialkyl (meth)acrylamide, which is a material of the polymer. This cooperative action prevents the emission of smoke or ignition when the cell is overcharged at a high rate, thereby improving safety against overcharging. Without at least one of these materials, it is impossible to improve safety against overcharging.

It is also apparent from Tables 1 to 3 that Examples 1 to 3, 5, 6, 12, and 13 have cycle characteristics (76 to 82%) similar to Comparative Examples 1 to 10 (58 to 80%) and Comparative Examples 11 to 24 (61 to 81%). Examples 1 to 3, 5, 6, 12, and 13 use a non-aqueous solvent containing methyl trimethylacetate (MTMA) and a monomer containing alkylene glycol diacrylate and/or N,N-dialkylacrylamide. On the other hand, Comparative Examples 1 to 10 use a non-aqueous solvent not containing methyl trimethylacetate, and Comparative Examples 11 to 24 use a monomer not containing alkylene glycol diacrylate or N,N-dialkylacrylamide. This indicates that a polymer obtained by polymerizing alkylene glycol diacrylate and/or N,N-dialkylacrylamide does not have an adverse effect on cell performance.

It is also apparent from Tables 1 to 3 that using alkylene glycol diacrylate and N,N-dialkylacrylamide in combination as a monomer has similar results to using either one of alkylene glycol diacrylate or N,N-dialkylacrylamide (see Examples 4 and 9).

It is also apparent from Tables 1 to 3 that using a monomer containing a plurality of types of alkylene glycol diacrylates has similar results to using alkylene glycol diacrylate and N,N-dialkylacrylamide on their own (see Examples 10, 22, and 23).

The results of Examples 1 to 21 indicate that an excellent effect is obtained when the content of methyl trimethylacetate is 10 to 90 volume %, and a further excellent effect is obtained when the content is 20 to 80 volume %.

These results are considered to be due to the following reasons. When the content of methyl trimethylacetate is low, the cooperative action between alkylene glycol diacrylate and tertiary carboxylic acid ester is not sufficient. When the content is high, on the other hand, although alkylene glycol diacrylate is contained, methyl trimethylacetate is decomposed by reaction with the electrodes, thereby reducing safety against overcharging.

The results of Examples 8, and 22 to 28 indicate that an excellent effect is obtained when the content of alkylene glycol diacrylate is 2.5 to 8.0 mass %, and a further excellent effect is obtained when the content is 3.5 to 7.0 mass %.

The results of Examples 12, and 29 to 34 indicate that an excellent effect is obtained when the content of N,N-dialkylacrylamide is 1.7 to 4.0 mass %, and a further excellent effect is obtained when the content is 2.3 to 3.5 mass %.

These results indicate that the alkylene glycol diacrylate content of a monomer is preferably 2.5 to 8.0 mass %, and more preferably 3.5 to 7.0 mass %, and that the N,N-dialkylacrylamide content of a monomer is preferably 1.7 to 4.0 mass %, and more preferably 2.3 to 3.5 mass %.

The results of Examples 8, 11, and 35 to 37 indicate that an excellent effect can be obtained as long as the monomer has the structure of alkylene glycol diacrylate, regardless of the number of alkylene glycol structure units or regardless of an alkylene structure (polyethylene, polypropylene).

The results of Examples 38 and 39 indicate that excellent results can be obtained from a combination of alkylene glycol diacrylate and a monomer having a polyester structure or polyvinyl formal. In this case, a sufficient effect can be obtained when the content of alkylene glycol diacrylate is 2.0% mass.

Since an acryloyl group and a methacryloyl group are known to have similar properties, acryloyl can be replaced by methacryloyl to obtain the same results.

INDUSTRIAL APPLICABILITY

As described hereinbefore, the present invention, which is a polymer electrolyte secondary cell with high safety against overcharging, provides high industrial applicability.

What is claimed is:
1. A polymer electrolyte secondary cell comprising:
 a positive electrode having a positive electrode active material;
 a negative electrode having a negative electrode active material; and
 a polymer electrolyte containing a non-aqueous solvent, an electrolyte salt, and a polymer, wherein
 the non-aqueous solvent contains a tertiary carboxylic acid ester represented by Formula 1, and
 the polymer is polymerized from monomers containing alkylene glycol (meth)acrylate and/or N,N-dialkyl (meth)acrylamide

Formula 1

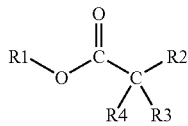

where R1 to R4 each denote a straight-chained or branched alkyl group having 4 or less carbon atoms and may be the same or different.

2. The polymer electrolyte secondary cell according to claim 1, wherein,
the tertiary carboxylic acid ester is methyl trimethylacetate and/or ethyl trimethylacetate.

3. The polymer electrolyte secondary cell according to claim 1, wherein,
the alkylene glycol (meth)acrylate is polypropylene glycol diacrylate.

4. The polymer electrolyte secondary cell according to claim 3, wherein,
the content of the polypropylene glycol diacrylate is 2.0 to 8.0 mass parts out of 100 mass parts of the total mass of the non-aqueous solvent and the electrolyte salt.

5. The polymer electrolyte secondary cell according to claim 1, wherein,
the N,N-dialkyl (meth)acrylamide is N,N-dimethylacrylamide.

6. The polymer electrolyte secondary cell according to claim 5, wherein,
the content of the N,N-dimethylacrylamide is 1.7 to 4.0 mass parts out of 100 mass parts of the total mass of the non-aqueous solvent and the electrolyte salt.

7. The polymer electrolyte secondary cell according to claim 1, wherein
the content of the tertiary carboxylic acid ester in the total volume of the non-aqueous solvent is 10 to 90 volume % at 25° C. and 1 atm.

* * * * *